No. 756,160. PATENTED MAR. 29, 1904.
A. EVENSEN.
VALVE MECHANISM FOR EXPLOSIVE ENGINES.
APPLICATION FILED MAR. 11, 1901.
NO MODEL. 4 SHEETS—SHEET 1.
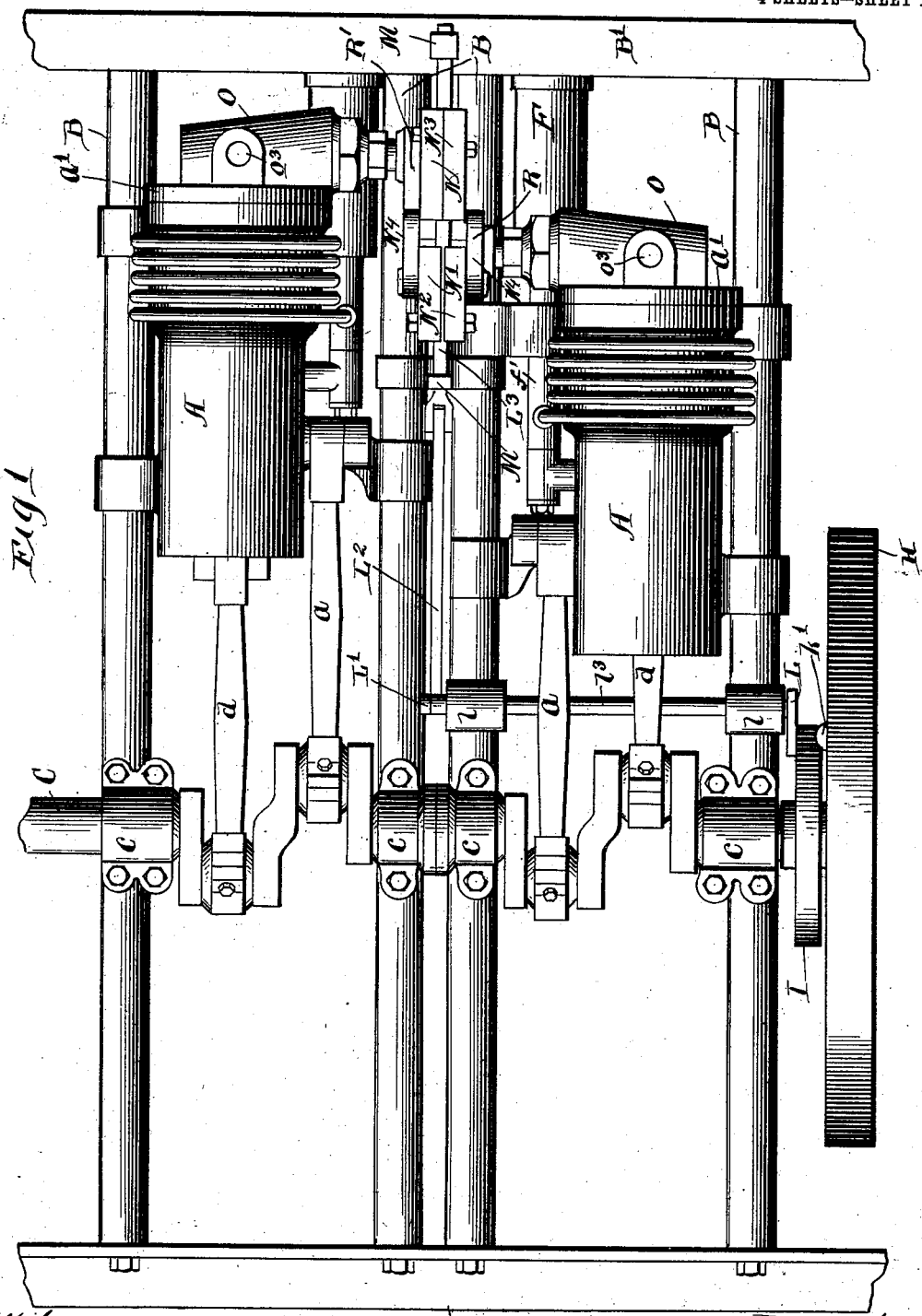

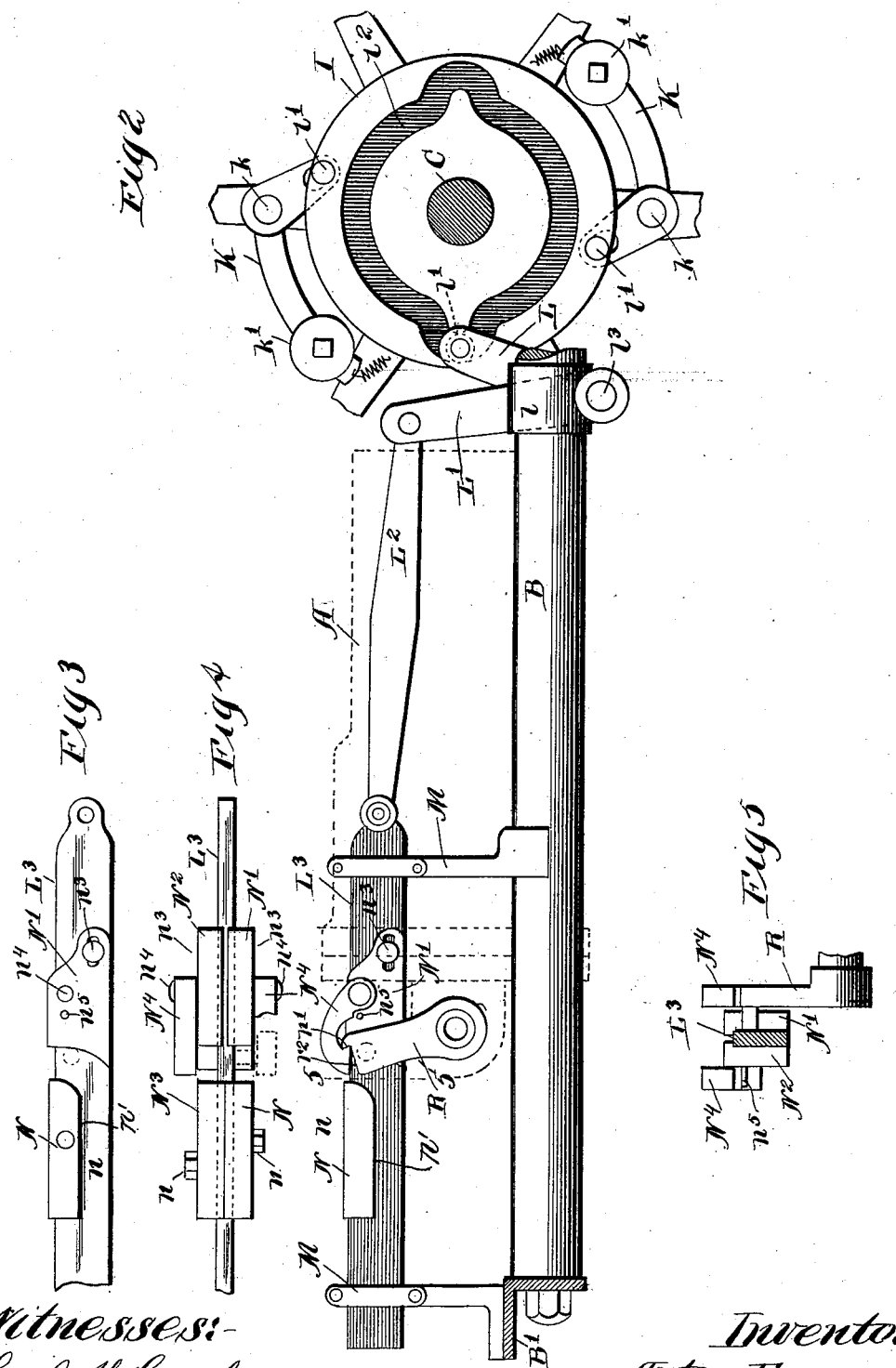

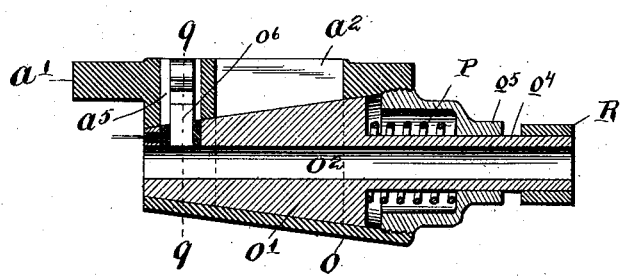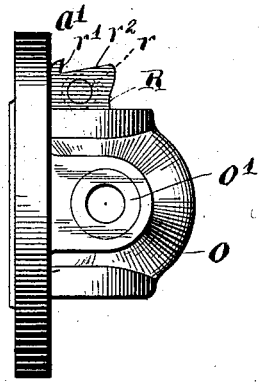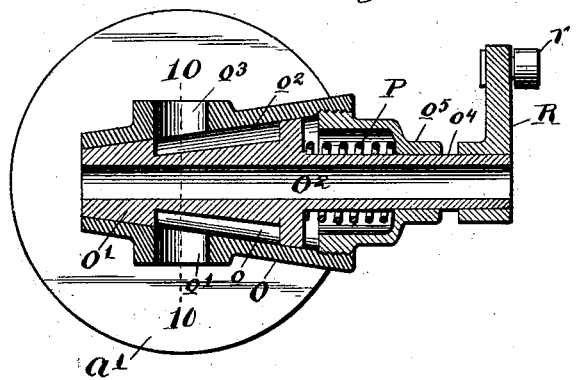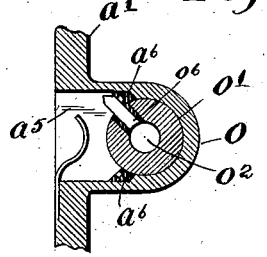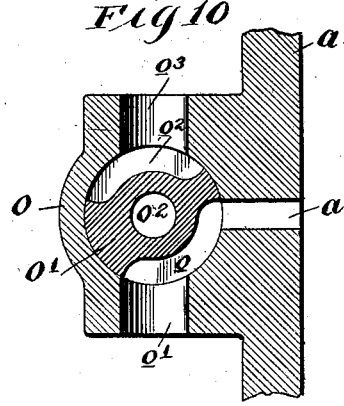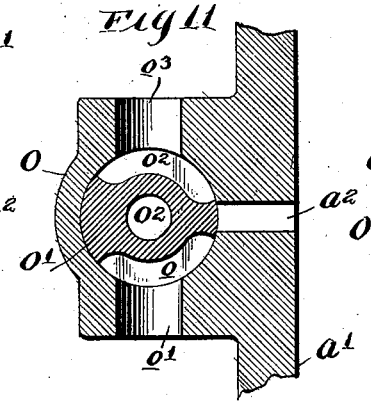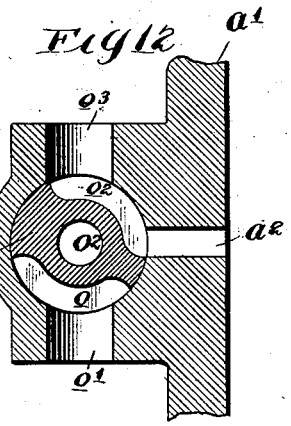

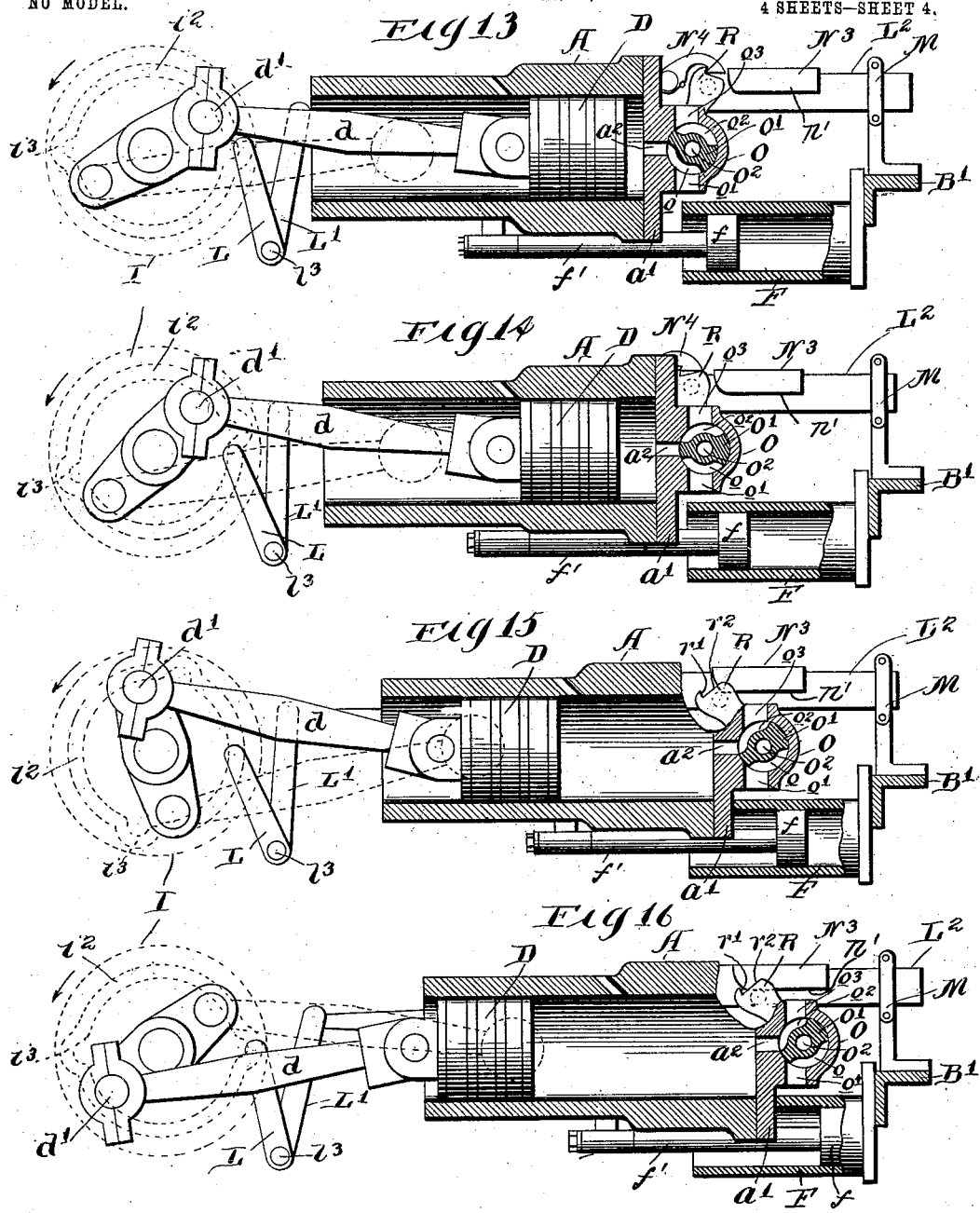

No. 756,160. Patented March 29, 1904.

UNITED STATES PATENT OFFICE.

ANTON EVENSEN, OF CHICAGO, ILLINOIS, ASSIGNOR OF ONE-HALF TO CHARLES R. HANNAN, OF COUNCIL BLUFFS, IOWA.

VALVE MECHANISM FOR EXPLOSIVE-ENGINES.

SPECIFICATION forming part of Letters Patent No. 756,160, dated March 29, 1904.

Application filed March 11, 1901. Serial No. 50,616. (No model.)

*To all whom it may concern:*

Be it known that I, ANTON EVENSEN, of Chicago, in the county of Cook and State of Illinois, have invented certain new and useful Improvements in Valves for Engines; and I do hereby declare that the following is a full, clear, and exact description thereof, reference being had to the accompanying drawings, and to the letters of reference marked thereon, which form a part of this specification.

This invention relates to valves and valve-governing devices for explosive-engines of that type wherein the cylinder has a longitudinal reciprocatory motion.

The invention consists in the matters hereinafter set forth, and more particularly pointed out in the appended claims.

In the drawings, Figure 1 is a plan view of a pair of coupled engines fitted with valve mechanism which embrace the salient features of my invention. Fig. 2 is a view showing the valve, tappets, and governor of such mechanism. Fig. 3 is a detail view in elevation of a set of knock-off blocks and pawls. Fig. 4 is a detail plan view of a set of knock-off blocks and pawls. Fig. 5 is a view in elevation and partially in section on line 5 5 of Fig. 2. Fig. 6 is a view in horizontal longitudinal section through the valve and cylinder-head. Fig. 7 is a view in end elevation of the cylinder-head and valve-casing. Fig. 8 is a view in perpendicular longitudinal section of the valve casing and closure. Fig. 9 is a view in section on line 9 9 of Fig. 6, showing the combination stop-pin and igniter. Fig. 10 is a view in cross-section on line 10 10 of Fig. 8. Fig. 11 is a view in cross-section similar to Fig. 10, but showing both ports closed, as at the moment of explosion. Fig. 12 is a view in cross-section similar to Fig. 10, but showing the exhaust-port open. Fig. 13 is a diagrammatic view of a cylinder, piston, valve, and governing mechanism with the feed-port open. Fig. 14 is a diagrammatic view of the parts at the moment of explosion. Fig. 15 is a diagrammatic view of the parts after the explosion on the outstroke, showing the exhaust-port open. Fig. 16 is a diagrammatic view of the parts on the return or in stroke at the feed moment of a coupled engine.

Referring to the drawings and the general disposition and arrangement of the main parts of an engine of this description as herein shown, A represents a cylinder closed at its outer end and having sliding connections with parallel guide-rods B. Said rods B form a part of the engine-frame, being connected at their ends by suitable cross-pieces B'. Said cylinder is connected by a connecting-rod $a$ with a main crank-shaft C, which is mounted in bearings $c$, secured on the guide-rods B. Said cylinder A is fitted with a piston D, which has a connecting-rod $d$, pivotally secured at one end to the piston-stem and at the other to a wrist-pin $d'$, fastened at the end of a crank-arm of equal length to the cylinder crank-arm and secured opposite thereto on the main shaft C.

O represents the casing of a valve, which is preferably connected with a cylinder-head $a'$, said valve being of a rotary or rocking type, as hereinafter more fully described.

The cylinder and piston connections as herein shown, together with the crank-shaft and engine-frame, are of a type described in my application for explosive-engines, filed November 2, 1900, Serial No. 35,203, and are not made the subject of claims in this application. Said piston and cylinder because of their connection with the opposite ends of the crank C have simultaneous and opposite reciprocating motion, the valve-casing O moving with said cylinder.

F indicates a stationary charge-compression cylinder, which is attached to the engine-frame with its central axis parallel with the axis of the main cylinder and in which is located a hollow piston $f$, having a hollow piston-rod $f'$ the outer end of which is rigidly attached to the outer face of the main cylinder, so that the piston-rod and piston are moved by and with said main cylinder. The connections of said charging cylinder with the valve-casing and other details of construction thereof are not herein shown, the same being fully illustrated and described in my said application for patent, Serial No. 35,203. The said charge-compressing cylinder with its hollow piston and piston-rod are shown in Fig. 17.

Referring now to the valve actuating and governing mechanism, H is the usual fly-wheel connected or keyed to the outer end of the main shaft C. A cam-disk I concentric with the main shaft is mounted loosely thereon next to the inner face of the driving-wheel H. Bell-crank levers K are pivotally mounted on studs $k$, secured in opposite arms or spokes of the fly-wheel H at points just outside of the periphery of the disk I, the shorter arms of said bell-cranks being turned inwardly and projecting over the face of said disk and having slotted engagement at their outer ends with pins $i'$, which are secured in the face of the disk near the periphery thereof. The longer arms of the bell-cranks carry weights $k'$, which have adjustable sliding connection with said arms and may be secured by setscrews or other means at any point on said arms, as desired. Consequently the disk I rotates with the fly-wheel H, being carried therewith through the action of the weighted-lever and pin connection with the spokes of the wheel. It is also obvious that the centrifugal force resulting from said revolution acting upon the weights $k'$ will tend to throw them outwardly, and thereby through the levers shift the position of the disk upon the main shaft C in relation to the fly-wheel H, according to the speed of rotation of the wheel. Said disk has in its face remote from the fly-wheel H a cam-groove $i^2$, which is preferably rectangular in cross-sectional form. Said groove is in the greater part of its length concentric with the periphery of the disk, but has a cam projection or outward deflection $i^3$ at a point determined by the position of the pin $i'$. As hereinafter more fully explained, said cam deflection $i^3$ may be repeated at regular intervals in the groove when the governing device is used to control a plurality of coupled engines.

A rocker-arm L is connected at one end to a pivot-shaft $l^3$, which is journaled in the castings $l$, secured to the engine-frame at a point near the main shaft. Said rocker-arm carries at its outer end a roller $l'$, adapted to travel in the cam-slot $i^2$ of the disk I. The shaft $l^3$ carries at the opposite end thereof from the arm L a second lever or rock arm L'. Said rock-arm L' is joined, by means of a connecting-rod $L^2$, with the end of an endwise-sliding rod $L^3$. Said slide-rod $L^3$ is arranged parallel to the guide-rod B and has endwise-sliding engagement with suitable guide-brackets M, which are secured to a suitable support, preferably to the main engine-frame. Oscillatory movement of the lever-arm L through the travel of the roller $l'$ in the cam-slot $i^2$ transmits a reciprocatory longitudinal motion to the slide-rod $L^3$ in a direction parallel to the path of movement of the cylinder and piston. Said slide-rod forms part of the actuating devices for operating the admission-valve of the cylinder.

The cylinder-valve is of the oscillatory or rocking type and comprises a casing O and plug O'. The casing, as shown, has the form of a hollow cylinder extending across the outer face of the cylinder-head $a'$, preferably integral therewith, and transverse to the line of reciprocating movement of the cylinder. Said casing O is bored out to form a slightly-tapered bearing or coned valved seat. The valve-plug O' is in form a truncated cone, which is fitted to the taper seat of the valve-casing. Said plug is hollow, having a circular duct $O^2$ leading from end to end for the circulation of air and for lightness of construction. Said closure or plug O' is cut away between its upper and lower ends so as to form a duct $o$ between the body of the closure and the casing O, leading part way around the plug and of sufficient length to be brought into simultaneous register by rocking or partially rotating the closure, with a downwardly-opening port $o'$ extending through the casing O and a feed-port $a^2$ opening through the cylinder-head $a'$ into the cylinder. Said port $o'$ is connected at its outer opening with a charging or compression chamber of the engine, which may be of any desired form, preferably that described in the application made by me for explosive-engines, Serial No. 35,203, hereinbefore mentioned. Said compression-chamber is not claimed in this application. The plug O' is also cut away between the ends thereof around a portion of its periphery diametrically opposite to the passage $o$, so as to form a duct $o^2$ between the side walls of the casing O and the plug O'. Said casing O is also provided with an aperture $o^3$, which is situated centrally thereof at a point remote from the cylinder feed-port $a^2$. Said duct $o^2$ is carried a sufficient distance around the plug O' so that during a certain period of revolution of the plug it registers with and connects the cylinder feed-port $a^2$ and the casing or exhaust port $o^3$. The hollow valve-stem $o^4$ in axial alinement with the main body of the plug is secured to the larger end thereof and passes through an apertured cap $o^5$, which has screw-threaded connection with the end of the valve-casing. Preferably and as herein shown said cap $o^5$ is exteriorly screw-threaded to engage the screw-threads of an annular recess or rabbet formed in the larger end of the valve-casing, the outer surface of the cap being fitted with facets, lugs, or slots, whereby a spanner, wrench, or other suitable means may be applied to screw it to its seat on the shoulder at the bottom of the rabbet. A spiral spring P encircles the valve-stem $o^4$ and bears against the inner face of the cap and against the larger end of the plug, thereby holding it in close fit with the tapered seat of the valve-chamber. This form of the construction and arrangement of parts gives a valve which is without any packing-gland around its stem, which wears evenly upon its seat, and automatically keeps itself free from leakage around the ports, thus insuring a sharp cut-off. Now referring to the means for operating the valve, devices are provided as follows: On the outer end of the valve-stem $o^4$, which projects a short distance beyond the cap $o^5$, a rocker-arm R is attached. Said rocker-arm carries near its outer end a roller $r$, journaled thereon. On the slide-rod $L^3$ at a point adjacent to the valve-casing O a block N is adjustably secured to said rod, preferably by means of the cap-screws $n$ on said rod, said block being adapted for engagement with the roller $r$ on the arm R. A pair of knock-off blocks $N'$ $N^2$ are adjustably secured to the slide-rod $L^3$ between the block N and the crank-shaft by means of cap-screws $n^3$ engaging slots in the blocks. Said tappets $N'$ $N^2$ have concave cam-surfaces at their ends adjacent to the block N. Each of said blocks carries a dog or pawl $N^4$, which is pivotally connected thereto by the stud $n^4$, Fig. 3, the free end of which extends rearwardly or toward the block N. Said free end of the pawl tends to fall by gravity, and its downward movement is limited by a stop-pin $n^5$. Said pawl is provided at its said free end with a downwardly-extending tooth arranged to engage the upper end of said rocker-arm R. Said rocker-arm is provided at its outer end with a shoulder $r'$, adapted to catch the pawl-tooth when carried thereunder, and with a flat surface $r^2$, which acts as a heel to raise the pawl-tooth out of position for engagement with the shoulder $r'$, as hereinafter more fully described. An insulated pin $o^6$, Figs. 6 and 9, which projects from the main body of the plug $O'$ into a slot $a^5$, opening into the cylinder through the cylinder-head $a'$, engages at either end of the slot a block of steel $a^6$, suitably secured on the cylinder-head and insulated therefrom. Said pin performs the double purpose of a stop to limit the throw of the valve and of a rocking terminal of a sparking device or igniter, which latter is made the subject of my divisional application filed of even date herewith for igniters for explosive-engines and is therefore not made the subject of claims in this application.

The operation of the valve mechanism is more clearly shown in Figs. 2, 10, 11, 12, 13, 14, 15, and 16 and is as follows: In Fig. 13 the piston D and cylinder-head $a'$ are shown as beginning to separate on the outstroke, the direction of motion of the crank-arm being indicated by the arrow. The rod $L^3$, which is stationary during the passage of the rocker-arm roller $l'$ in the circular part of the groove $i^2$ of the disk I, is at this time in its extreme outward position, owing to the travel of the roller over the cam deflection in said groove, the disk being so adjusted in position as to cause this action at this moment. At the time the rod is being thrust back to this position the tappet $N'$ engages the valve-rocker arm R with its cam-face, moving the valve-closure $O'$ into the position shown in said Fig. 13 and also in Figs. 2 and 10, where its duct $o$ registers with the aperture $a^2$ of the cylinder-head $a'$, thereby allowing the cylinder to be charged through the feed-port of the valve. As the rotation of the main shaft continues the roller $l'$ moves back to the main part of the groove, carrying the rod $L^3$ and the tappets with it. At the same time the cylinder and piston progress on their outstroke, so that the disk, cranks, piston, and cylinder assume the position shown in Fig. 11. As the tappet $N'$ recedes from the valve-rocker arm R the dog $N^4$ catches the shoulder $r'$ of the rocker-arm R and throws the valve-closure $O'$ into the position illustrated in Fig. 14, where the feed and exhaust ducts are entirely closed. This is the moment of explosion, the device for effecting ignition being arranged to act at this instant. As the rotation continues the cylinder movement pushes the heel of the rock-arm against the pawl-face, so as to trip it, and then the roller $r'$ comes in contact with the tappet N, which turns the rock-arm to the inwardly-inclined position. (Shown in Fig. 15.) This rotates the valve-closure $O'$, so as to open the exhaust-port. From this time until the end of the return stroke, Fig. 16, the roller $r$ of the valve-rocker arm R rides against a plane surface $n'$ on the tappet N parallel to the line of cylinder movement, so that the longitudinal movement of the rod $L^3$ during this period of the revolution has no effect on the position of the valves. A set of tappets and pawls $N^2$ $N^3$ may be mounted on the rod, as shown in Figs. 1 and 4, which during this period of rest of the valve-rocker arm R may engage another rocker-arm, as $R'$, Fig. 1, and thereby control the valve of a coupled engine. In the case of two engines, as disclosed in Fig. 1, it is evident that the valves, tappets, and cam deflections are positioned so that the engines work opposite to each other, thereby producing a perfect balance. Where three engines are coupled, the valves and cranks are set to work at angles of one hundred and twenty degrees from each other. It is obvious that a plurality of coupled engines may therefore be controlled by one governor. As varying speeds of rotation result in variations in the centrifugal force acting upon the weights $k'$ and consequent shifting of the position of the disk I upon the shaft relative to the crank-arm, it follows that the position of the valve-closure is made to vary relative to the cylinder and piston, so as to occur earlier or later in the stroke, and hence to allow a greater or lighter charge to be admitted into the cylinder. Thereby the engine does its work with practically constant speed, accommodating itself to varying loads. The valve and valve-seat are worn to a true fit by the action of the closure on the seat. The position of the valve-stem is such that the usual gland and packing may be dispensed with. The tappets, pawls, and governor have a minimum number of wearing parts and are positive and certain in action. As shown, the governor may be extended to control a plurality of coupled engines without undue multiplication of parts, additional tappets, pawls, and cam deflections being the only requirements.

While the form of valve mechanism as set forth in this application is peculiarly adapted to the form of engine described in my application for explosive-engines, Serial No. 35,203, filed November 2, 1900, it may be easily adapted to the requirements of any form of engine of this class, and I do not limit myself to specific forms of construction save as set forth in the appended claims.

I claim as my invention—

1. In an explosive-engine, a valve-gear for the engine-cylinder comprising a casing having a hollow seat, a plug having oscillatory motion on said seat and a rocker-arm secured to one end of said plug, and means acting on the outer end of said arm for giving oscillatory movement thereto embracing a pawl which is alternately engaged and tripped by said arm, said arm having a heel which strikes and moves the pawl to release the same from the arm.

2. An explosive-engine comprising a cylinder having longitudinal movement, a piston in the cylinder, a valve which moves with said cylinder, and means for actuating the valve embracing tappets on the machine-frame which are brought into action alternately by said cylinder movement.

3. An explosive-engine comprising a cylinder having reciprocatory, longitudinal movement, a piston in the cylinder, a valve-gear for said cylinder comprising a seat moving with said cylinder and a plug in said seat, a rocker-arm attached to said plug, and tappets on the machine-frame, said rocker-arm being brought into alternate engagement with said tappets by said cylinder movement.

4. An explosive-engine comprising a cylinder having longitudinal motion, a piston in the cylinder, a valve which moves with said cylinder, and means for actuating the valve embracing tappets and a pawl on the machine-frame, and a moving part connected with the closure and which is brought into successive engagement with said tappets and pawl by said cylinder movement.

5. An explosive-engine comprising a cylinder having longitudinal motion, a piston in the cylinder, a valve-gear for said cylinder comprising a seat moving with said cylinder and a plug engaging said seat, a rocker-arm connected with said plug and tappets and a pawl on the machine-frame, said rocker-arm being brought into alternate engagement with said tappets and said pawl by said cylinder movement.

6. An explosive-engine, comprising a cylinder having reciprocatory, longitudinal movement, a piston in the cylinder, a valve for said cylinder moving therewith, coacting means on the valve and engine-frame adapted to be brought into engagement by said cylinder movement, whereby said valve is alternately opened and closed, and governing means acting to shift the position of said means on the frame.

7. An explosive-engine comprising a cylinder having reciprocatory, longitudinal movement, a piston in the cylinder, a valve for said cylinder moving therewith, means for actuating the valve embracing tappets, and a pawl on the machine-frame and a part connected with the moving part of the valve which is brought into engagement with said tappets and pawl by the said cylinder motion, and governing means acting to vary the position of said tappets and pawl.

8. An explosive-engine comprising a cylinder having reciprocatory, longitudinal movement, a piston in the cylinder, a rod parallel to said cylinder, tappets and pawl on said rod, a valve for said cylinder moving therewith and provided with a part which is brought into engagement with said tappets and pawl by the cylinder motion, and means acting to shift the rod longitudinally.

9. An explosive-engine comprising a cylinder having reciprocatory, longitudinal movement, a piston in the cylinder, a valve for said cylinder moving therewith, a main shaft, a cam on said main shaft, a rod, and operative connection between said cam and said rod acting to impart longitudinal, reciprocating movement to said rod, and tappets and a pawl on said rod adapted to actuate said valve.

10. An explosive-engine comprising a cylinder having reciprocatory, longitudinal movement, a piston in the cylinder, a valve for said cylinder moving therewith, a main shaft, a cam on said shaft, a rock-shaft, a rocker-arm extending from said rock-shaft and engaging said cam, a second rocker-arm extending from said rock-shaft, a rod connected at one end to said second rocker-arm whereby said cam imparts an intermittent, reciprocatory, longitudinal movement to said rod, tappets and a pawl on said rod, and a rock-arm secured to said valve and adapted for engagement with said tappets and pawl.

11. An explosive-engine, comprising a cylinder having reciprocatory, longitudinal movement, a piston in the cylinder, tappets, a pawl, a valve for said cylinder moving therewith and provided with a part adapted for engagement with said tappets and pawl, a main shaft, a cam on said shaft, a rod having connection with said cam and carrying said tappets and pawl, said cam acting to impart reciprocatory, longitudinal movement to said rod, and means constructed to automatically vary the angular relation of said cam and shaft.

12. An explosive-engine, comprising a cylinder having reciprocatory, longitudinal movement, a piston in the cylinder, tappets and a pawl on the machine-frame, a valve for said cylinder moving therewith provided with a part adapted for engagement with said tappets and pawl; a fly-wheel, a cam having operative connection with said tappets to vary their positions relative to the cylinder-stroke, a lever connected with said fly-wheel, and a weight on said lever having operative connection with the cam and operating by centrifugal force to vary the position of said cam with respect to the fly-wheel.

13. An explosive-engine, comprising a cylinder having reciprocating, longitudinal movement, a piston in the cylinder, a rod having intermittent reciprocating, longitudinal movement parallel to said cylinder, tappets and a pawl on said rod and a valve for said cylinder embracing a part which is adapted to be brought into operative engagement with said tappets and pawl by the relative movements of said cylinder and rod, one of said tappets being formed to hold said valve in one position during a portion of the piston-stroke.

14. An explosive-engine comprising two cylinders having reciprocating movement, pistons in the cylinders, a rod having reciprocating, longitudinal movement parallel to said cylinders, tappets and a pawl on said rod and valves for said cylinders provided each with parts adapted to be brought into engagement with said tappets and pawl by the relative movements of said rod and cylinder, one of said tappets being adapted to hold said valve in a fixed position during a portion of the stroke of each cylinder, and the tappets and pawl on said rod operating the valve of one cylinder during the period of rest of the valve of the other cylinder.

15. An explosive-engine comprising a cylinder having reciprocatory, longitudinal movement, a piston in the cylinder, tappets and a pawl, a valve for said cylinder moving therewith, and provided with a part which is adapted to be brought into engagement with said tappets and pawl, a cam on the engine-shaft provided with a concentric groove having an outward deflection therein, a rock-shaft having rocker-arms, a roller journaled on one of said arms engaging said cam-groove, and operative connections between the other of said rocker-arms and said tappets and pawl.

In testimony that I claim the foregoing as my invention I affix my signature, in presence of two witnesses, this 6th day of March, A. D. 1901.

ANTON EVENSEN.

Witnesses:
   CLEMENS R. STICKNEY,
   BERTHA A. PRICE.